US012762864B2

(12) United States Patent
Ghannam et al.

(10) Patent No.: US 12,762,864 B2
(45) Date of Patent: Oct. 13, 2026

(54) VEHICLE COMPONENT COMPENSATION

(71) Applicant: Ford Global Technologies, LLC, Dearborn, MI (US)

(72) Inventors: Mahmoud Yousef Ghannam, Canton, MI (US); Robert Schroeter, Livonia, MI (US); Faizan Shaik, Ann Arbor, MI (US); Hussein Altameemi, Romulus, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 240 days.

(21) Appl. No.: 18/648,772

(22) Filed: Apr. 29, 2024

(65) Prior Publication Data

US 2025/0336212 A1 Oct. 30, 2025

(51) Int. Cl.

| | |
|---|---|
| ***G06V 20/00*** | (2022.01) |
| ***B60H 1/00*** | (2006.01) |
| ***G06V 10/60*** | (2022.01) |
| ***G06V 10/82*** | (2022.01) |
| ***G06V 20/56*** | (2022.01) |

(52) U.S. Cl.
CPC ......... *G06V 20/56* (2022.01); *B60H 1/00807* (2013.01); *G06V 10/60* (2022.01); *G06V 10/82* (2022.01)

(58) Field of Classification Search
CPC ........ G06V 20/56; G06V 10/60; G06V 10/82; B60H 1/00807; B60H 1/00985; B60H 1/00735; B60H 1/00814; B60H 1/00878; B60R 16/023; B60R 16/037
See application file for complete search history.

(56) References Cited

U.S. PATENT DOCUMENTS

| | | | | |
|---|---|---|---|---|
| 7,855,376 | B2 * | 12/2010 | Cantin | G01P 13/00 250/221 |
| 10,377,212 | B2 * | 8/2019 | Glatfelter | B60J 3/02 |
| 2002/0181743 | A1 * | 12/2002 | Khairallah | B60R 21/01538 382/104 |
| 2018/0120441 | A1 * | 5/2018 | Elooz | B60Q 1/0023 |
| 2019/0047382 | A1 * | 2/2019 | Glatfelter | B60J 3/02 |
| 2023/0186593 | A1 * | 6/2023 | Tryndin | G06V 10/60 315/82 |
| 2023/0242079 | A1 * | 8/2023 | Hikida | B60S 1/0844 348/148 |

FOREIGN PATENT DOCUMENTS

| | | | |
|---|---|---|---|
| CN | 111976433 | A | 11/2020 |
| TW | M610067 | U | 4/2021 |

* cited by examiner

*Primary Examiner* — Van D Huynh

(74) *Attorney, Agent, or Firm* — Frank Lollo; Brooks Kushman P.C.

(57) ABSTRACT

A computer may determine a first illumination value based on an image of a space about a vehicle and, upon the first illumination value exceeding a threshold, determine second illumination values for respective zones of the image. The zones may be defined based on a vehicle component. The computer may actuate the vehicle component based on a comparison of at least some of the second illumination values of respective zones to one another.

20 Claims, 8 Drawing Sheets

VEHICLE COMPONENT COMPENSATION

BACKGROUND

A vehicle may be equipped with components such as controls for propulsion, steering, environmental components such as heating, ventilation, and/or air-conditioning (HVAC) including related controls, and display components that include displays for vehicle status such as speed and battery charge, etc., navigation such as map and directions, etc., and infotainment such as music and video, etc. and sensors that acquire data regarding the operation of the vehicle.

DETAILED DESCRIPTION

Figure 1:
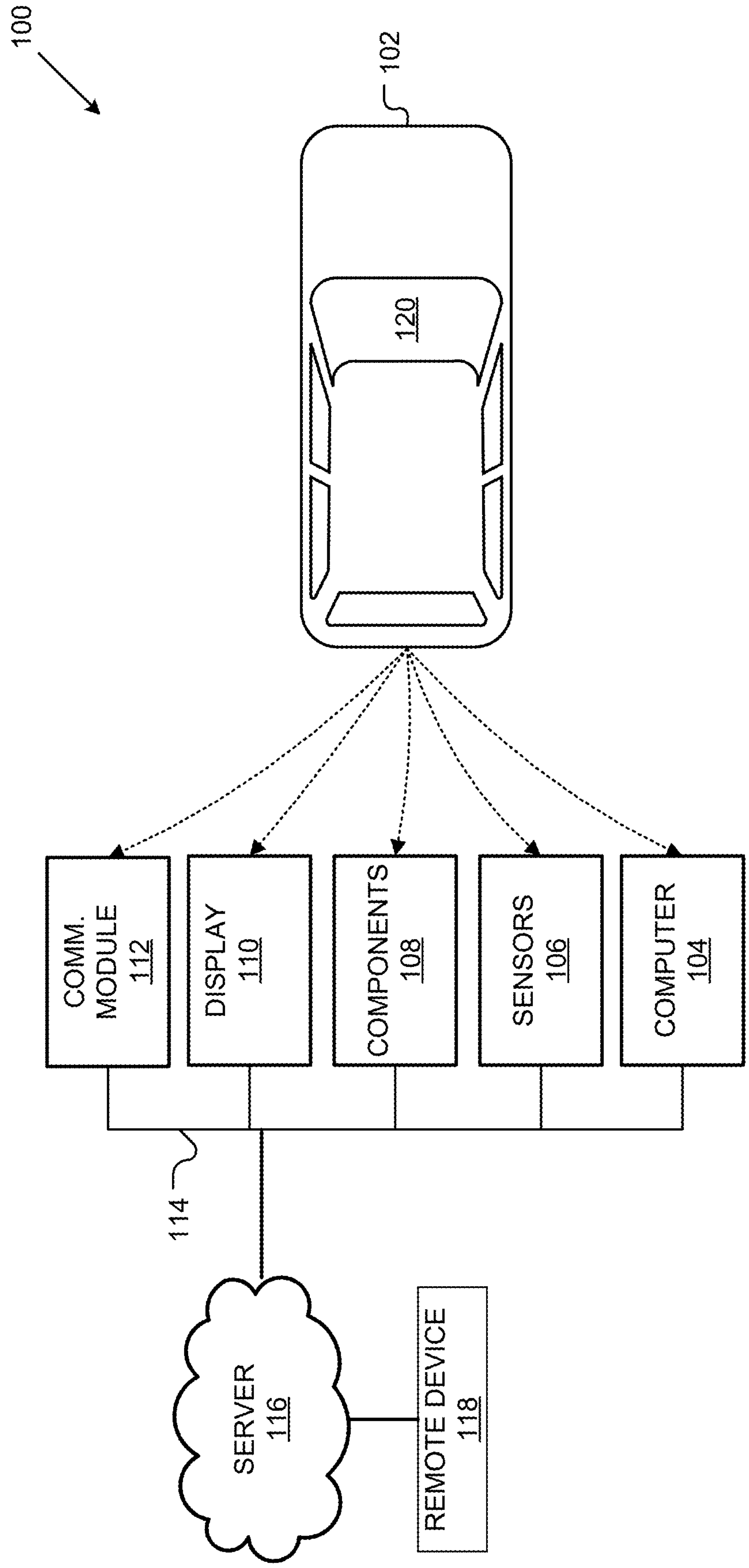
FIG. 1 is a block diagram illustrating an example vehicle system.

Techniques described herein can detect local changes in illumination and actuate vehicle components based on the local changes. A vehicle computer may capture an image of an area and divide the image into a number of zones based on a vehicle component. The computer can enhance the operation of vehicle components by actuating the vehicle component based on the illumination values.

Vehicles can use sensor data to control vehicle components without requiring intervention by vehicle occupants. For example, HVAC systems can control air temperature and delivery volume based on sensors that detect air temperature within a vehicle cabin. Other vehicle systems can control display brightness based on sensors that detect overall ambient light in the vehicle cabin. Relatively simple sensors that measure overall ambient temperature or brightness in a vehicle cabin can be effective in many situations, but there are common exceptions. For example, direct sunlight that illuminates a portion of a vehicle's interior can cause local variations in illumination and temperature that can be undetected by sensors that measure overall ambient temperature or illumination. As a result, local changes in illumination and/or temperature which, if detected, could be used to enhance the operation of vehicle components, can go undetected.

An example of local variations in illumination that could be used to enhance vehicle components is direct sunlight on an area of a vehicle cabin, e.g., that is occupied by a single occupant. An occupant in an area subject to direct sunlight can experience local heating due to the direct sunlight that might warrant additional air-conditioning even though a sensor that detects ambient air temperature in a zone that includes the occupant may not detect a large enough change in temperature for an HVAC control to actuate additional cooling, e.g., an increase in cool air flow. Another example of effects of sunlight in a vehicle cabin relates to display brightness. A local increase in direct sunlight can wash out a display and render the display unviewable while a sensor that detects overall brightness does not register the change. Thus, as described herein, it can be beneficial to control one or more vehicle components based on illumination values detected in a vehicle cabin.

Accordingly, included in the present disclosure is a system comprising a computing device, the computing device including a processor and a memory, the memory storing instructions executable by the processor, including instructions to: determine a first illumination value based on an image of a space about a vehicle; upon the first illumination value exceeding a threshold, determine second illumination values for respective zones of the image, the zones being defined based on a vehicle component; and actuate the vehicle component based on a comparison of at least some of the second illumination values of respective zones to one another.

The computing device may determine the first and second illumination values after compensating for sensor saturation.

The image may be one of the space through a window outside of the vehicle.

The vehicle component may be a climate control system.

The vehicle component may be a vehicle display.

The zones may be further defined based on a resolution of a sensor.

The first and second illumination values may be irradiance per unit area measured in lux.

The computing device may collect a plurality of images of the space over a specified time.

The second illumination values may be weighted by respective acquisition times of the images.

Some of the zones may overlap.

The computing device may compare the second illumination values by a neural network.

The neural network may compensate for at least one of saturation, gain, and exposure time.

A method comprises: determining a first illumination value based on an image of a space about a vehicle; upon the first illumination value exceeding a threshold, determining second illumination values for respective zones of the image, the zones being defined based on a vehicle component; and actuating the vehicle component based on a comparison of at least some of the second illumination values of respective zones to one another.

The first and second illumination values may be determined after compensating for sensor saturation.

The image may be of the space through a window outside of the vehicle.

The vehicle component may be a climate control system.

The vehicle component may be a vehicle display.

The first and second illumination values may be irradiance per unit area measured in lux.

A plurality of images of the space may be collected over a specified time.

Each image may have an acquisition time respectively.

Figure 2:
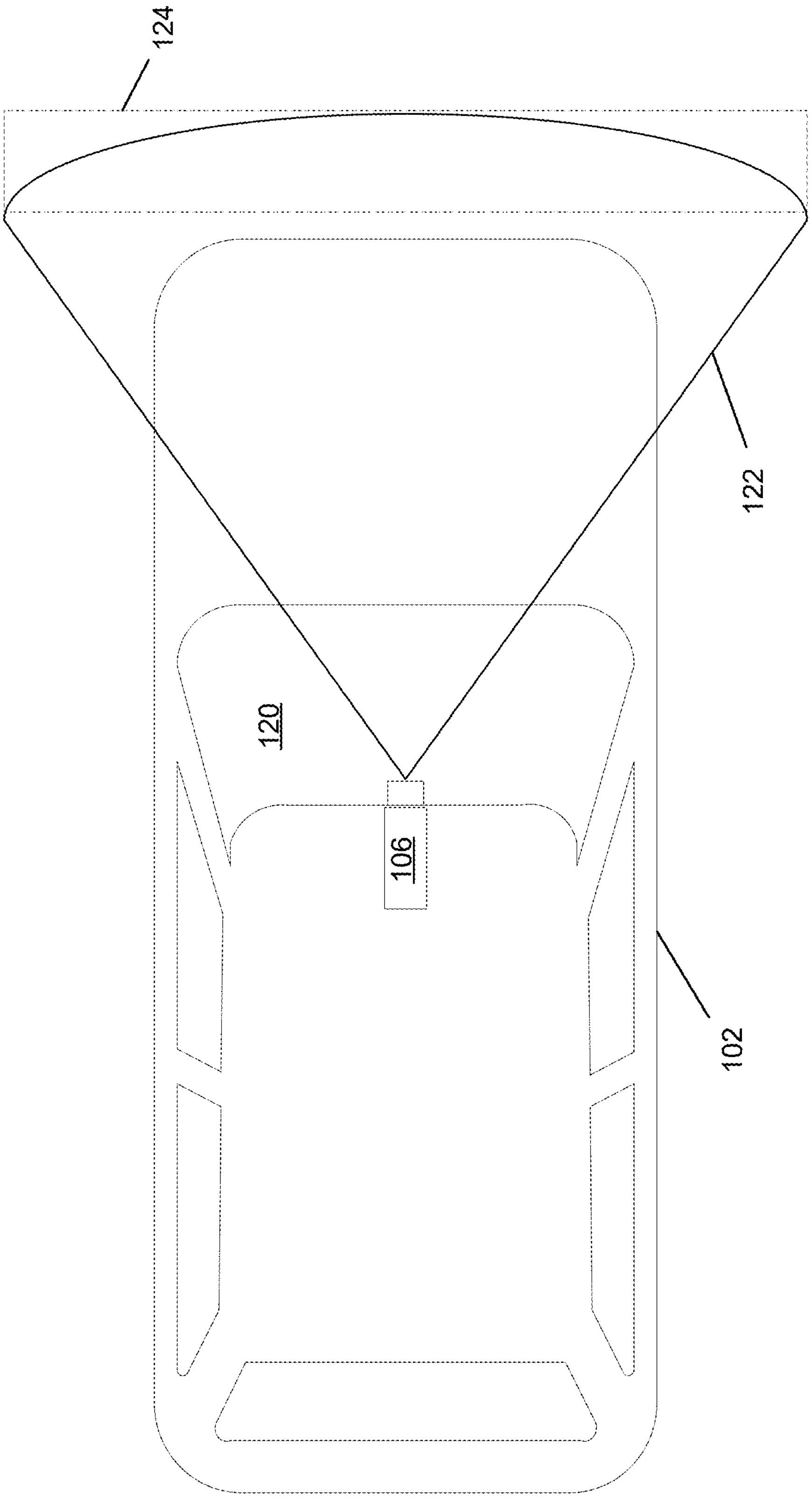
FIG. 2 illustrates an example area captured by an image.

Referring to FIGS. 1 and 2, a vehicle system 100 is illustrated. The vehicle 102 includes a computer 104 having a memory that includes instructions executable by the computer 104 to carry out processes and operations including as described herein. The computer 104 may be communicatively coupled via a communication network, such as a vehicle network 114, with sensors 106, components 108, a display 110, and a communication module 112 in the vehicle 102. The vehicle 102 includes at least one window 120. The vehicle 102 may be any passenger vehicle such as a car, a truck, a sport utility vehicle, a crossover, a van, a minivan, a taxi, a bus, ICE (Internal Combustion Engine), BEV (Battery Electric Vehicle), hybrid, a PHEV (Plug-in Hybrid Electric Vehicle), etc.

As mentioned above, the vehicle computer 104 (referred to below as "vehicle computer 104" or "computer 104") includes a processor and a memory. The memory includes one or more forms of computer readable media, and stores instructions executable by the computer 104 for performing various operations, including as disclosed herein. For example, the computer 104 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation (e.g., an ASIC for processing sensor data and/or communicating the sensor data). In another example, the computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming (e.g. stored in a memory electrically connected to the FPGA circuit). In some examples, a combination of processor(s), ASIC(s), and/or FPGA circuits may be included in a computer 104.

The memory can be of any type (e.g., hard disk drives, solid state drives, servers, or any volatile or non-volatile media). The memory can store the collected data sent from the sensors 106. The memory can be a separate device from the computer 104, and the computer 104 can retrieve information stored by the memory via the network 114 in the vehicle 102 (e.g., over a CAN bus, a wireless network, etc.) Alternatively or additionally, the memory can be part of the computer 104 (e.g., as a memory of the computer 104).

The computer 104 may include programming to operate one or more of vehicle components 108 such as propulsion (e.g., control of speed in the vehicle 102 by controlling one or more of an internal combustion engine, electric motor, hybrid engine, etc.), steering, interior and/or exterior lights, HVAC, HUD lighting, etc., as well as to determine whether and when the computer 104, as opposed to a human operator, is to control such operations.

The computer 104 may include or be communicatively coupled to (e.g., via the vehicle network 114 such as a communications bus) more than one processor (e.g., included in components 108 such as sensors 106, electronic control units (ECUs) or the like included in the vehicle 102 for monitoring and/or controlling various vehicle components 108 (e.g., a powertrain controller a steering controller, etc.) The computer 104 is generally arranged for communications on the vehicle communication network 114 that can include a bus in the vehicle 102 such as a controller area network CAN or the like, and/or other wired and/or wireless mechanisms. Alternatively or additionally, in cases where the computer 104 actually comprises a plurality of devices, the vehicle communication network 114 may be used for communications between devices represented as the computer 104 in this disclosure. Further, as mentioned below, various controllers and/or sensors 106 may provide data to the computer 104 via the vehicle communication network 114.

Via the vehicle network 114, the computer 104 may transmit messages to various devices and/or components 108 in the vehicle 102 and/or receive messages (e.g., CAN messages) from the various devices and/or components 108 (e.g., sensors 106, ECUs, etc.) Alternatively, or additionally, in cases where the computer 104 actually comprises a plurality of devices, the vehicle communication network 114 may be used for communications between devices represented as the computer 104 in this disclosure. Further, as mentioned below, various controllers and/or sensors 106 may provide data to the computer 104 via the vehicle communication network 114.

The display 110 renders visual data for viewing by occupants of a vehicle 102. The display 110 can display visual data in monochrome or color and the visual data can be updated at a frame rate, which can be 60 frames per second, for example. Displayed visual data can be a static image, where the majority of the area does not change from frame to frame, or a dynamic image, where the majority of the area changes from frame to frame.

The vehicle communication module 112 allows the vehicle computer 104 to communicate with a remote device 118 of the server 116 by way of example, a messaging or broadcast protocol such as Dedicated Short Range Communications (DSRC), Cellular Vehicle-to-Everything (C-V2X), Bluetooth® Low Energy (BLE), Ultra-Wideband (UWB), Wi-Fi, cellular, and/or other protocol that can support vehicle-to-vehicle, vehicle-to-structure, vehicle-to-cloud communications, or the like.

Vehicle sensors 106 may include a variety of devices such as are known to provide data to the vehicle computer 104. Sensors 106 may collect data related to the vehicle 102 and the environment in which the vehicle 102 is operating. By way of example, and not limitation, sensors 106 may include, i.e., altimeters, cameras, LIDAR, radar, ultrasonic sensors, infrared sensors, pressure sensors, gyroscopes, temperature sensors, hall sensors, optical sensors, voltage sensors, current sensors, mechanical sensors such as switches, etc. The sensors 106 may sense the environment in which the vehicle 102 is operating (i.e., sensors 106 can detect phenomena such as weather conditions (precipitation, external ambient temperature, etc.), the grade of a road, the location of a road (i.e., based on road edges, lane markings, etc.), or locations of target objects such as neighboring vehicles 102). In an example where the sensor 106 is a camera, the sensor 106 may have a field of view 122 which defines the space which may be captured in an image 126 (see FIG. 4) by the sensor 106. The sensor 106 may capture an image 126 of a space 124 within the field of view 122. That is, the space 124 may be included in the field of view 122 of the sensor 106. The space 124 is a three-dimensional space. The image 126 thus represents the three-dimensional space 124 in a two dimensional format.

In the examples described herein, the image 126 is of the space 124 viewed through the window 120 of the vehicle 102. However, it will be understood that the image 126 may be of any space 124 about the vehicle. That is, the image 126 may of any space 124 interior or exterior to the vehicle 102 and viewable from the vehicle 102. The space 124 need not necessarily be viewed through the window 120. For example, the sensor 106 may be supported by an exterior surface of the vehicle 102 and capture an image 126 of the space 124 in front of the vehicle without an intervening window 120. Additionally the sensor 106 may be a camera not supported by the vehicle 102, such that the image 126 may be of the vehicle 102 itself. For example, the sensor 106 may be a camera supported by a structure with a field of view 122 including a space 124 where the vehicle 102 is parked or travelling. In such an example, the sensor 106 may capture the image 126 of the space 124 including the vehicle 102.

Some sensors 106 may be illumination sensors that may further be used to collect data including illumination values of the image 126 captured by the sensor 106. Illumination values may, for example, refer to illuminance (e.g. irradiance per unit area) measured in lux. Lux is a unit of measurement of luminous flux (i.e., a total amount of visible light emitted by a source per unit of time) per unit area. 1 lx is equal to 1 lumen per square meter. The lumen is a measurement of the power of light visible to the human eye that is produced by a source. As an example, a typical fluorescent lightbulb may produce 500 lx. The sensor 106 may measure illumination values by means of one or more photodiodes. As an example, the sensor 106 may be a sunload sensor. A sunload sensor (Thermometrics Solar Sensor) is a sensor capable of measuring light intensity. A sunload sensor may use internal photo diodes, which provide increased electrical resistance as light intensity increases, to measure light intensity as is known.

The vehicle computer 104 can be programmed to receive data from one or more sensors 106, e.g., substantially continuously, periodically, and/or when instructed by the remote device 118, etc. The data may, for example, include image data of the environment around the vehicle 102 such as the image 126. In such an example, the image data may include one or more objects and/or markings, e.g., lane markings, on or along a road. Image data herein means digital image data, i.e., comprising pixels, typically with intensity and color values, that may be acquired by cameras. The sensors 106 may be mounted to any suitable location in or on the vehicle 102, e.g., on a vehicle 102 bumper, on a top of a vehicle 102, etc., to collect images 126 of the environment around the vehicle 102.

The remote device 118 may be a conventional computing device, i.e., including one or more processors and one or more memories, programmed to provide operations such as disclosed herein. Further, the remote device 118 may be accessed via the server 116, e.g., the Internet, a cellular network, and/or or some other wide area network.

As illustrated in FIG. 2, the sensor 106 may capture the image 126 of the space 124 within the field of view 122 of the sensor 106. In the current example, the field of view 122 of the sensor 106 extends through the window 120 over the front of the vehicle 102; for example, the field of view 122 can at least in part include an extent over a portion of what is typically referred to as the vehicle hood, and can further extend forward the on the hood. Accordingly, the space 124 of the image 126 to be captured by the sensor 106 can correspond to a space in front of the vehicle 102. FIG. 2 illustrates a non-limiting example; a sensor 106 could be positioned on any suitable surface of the vehicle 102 as mentioned above. Therefore, it will be understood that in other examples the field of view 122, and thus the space 124, may correspond to any space about the vehicle 102 that is viewable by the sensor 106. For example, the sensor 106 could be supported by a pillar of the vehicle 102 and arranged such that the field of view 122 extends to the right of the vehicle 102.

Figure 3:
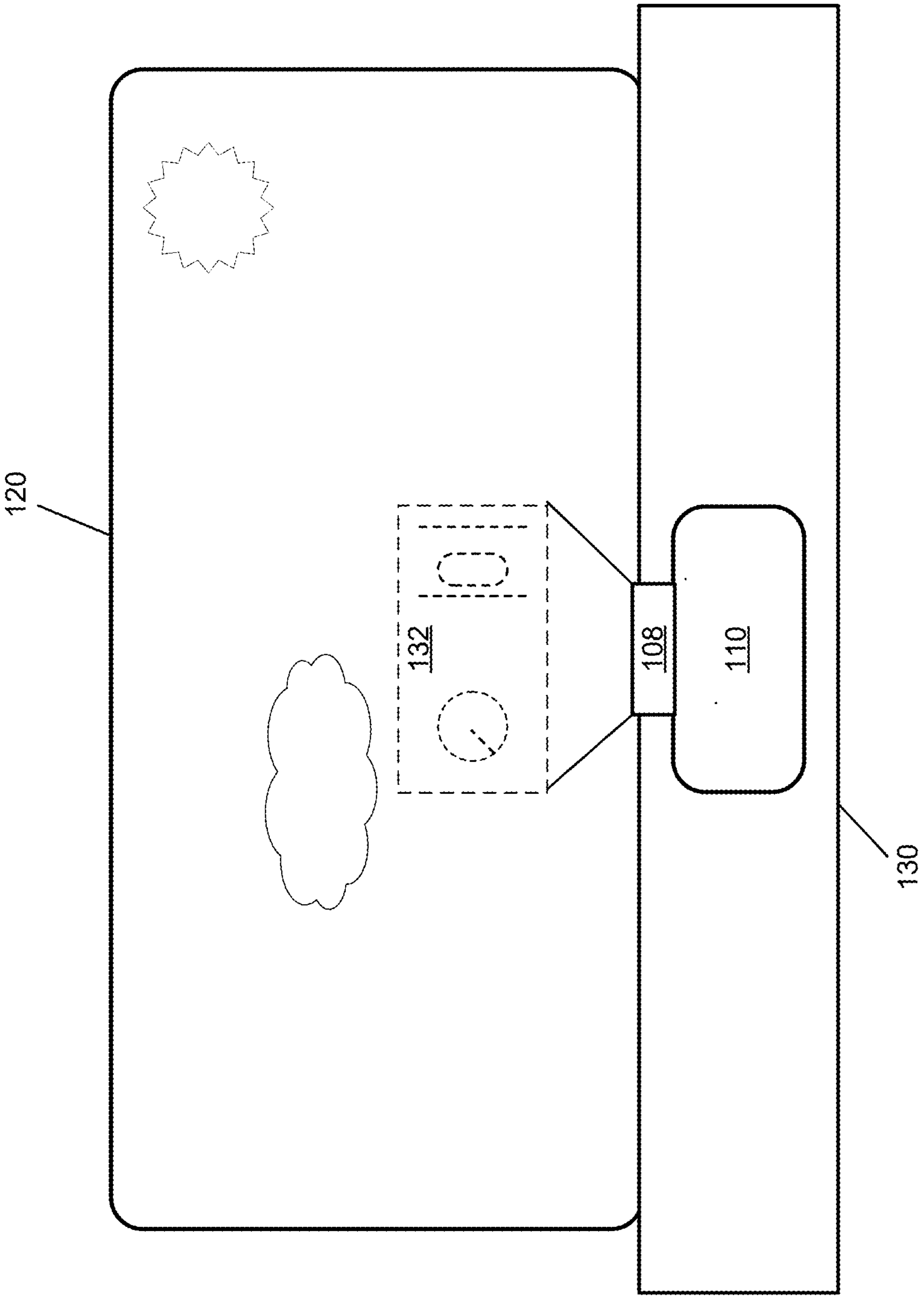
FIG. 3 illustrates an example heads-up display.

Referring now to FIG. 3, along with FIGS. 1-2, the vehicle 102 may include a heads-up-display 132 ("HUD"). FIG. 3 is a diagram of a forward view of an interior of the vehicle 102 illustrating the display 110, HUD projector component 108, dashboard 130, HUD 132, and the window 120. FIG. 3 illustrates an example component 108 (e.g. a projector) which may be actuated based on the illumination values of the image 126. A HUD 132, as used herein, refers to a pattern of data that is projected onto the window 120 such that the data is readable by a vehicle occupant when viewing the window 120. For example, the HUD 132 could include representations of icons, tables, graphs, dials, etc., providing data about the vehicle 102, such as to indicate a velocity of the vehicle 102, a cabin temperature, an outdoor temperature, a status of vehicle fuel, a position of the vehicle 102 on a road, etc. The projector component 108 of the present example is an array of LED's (herein referred to as a "HUD projector component") which is configured to project a HUD 132, though there may be a plurality of components 108 which may be actuated based on the illumination values. For example, the component 108 could be a device other than the HUD projector (e.g., an HVAC unit). Alternatively or additionally, the system 100 could be configured to control multiple components 108, e.g., a HUD projector component and an HVAC component, as described herein.

Figure 4:
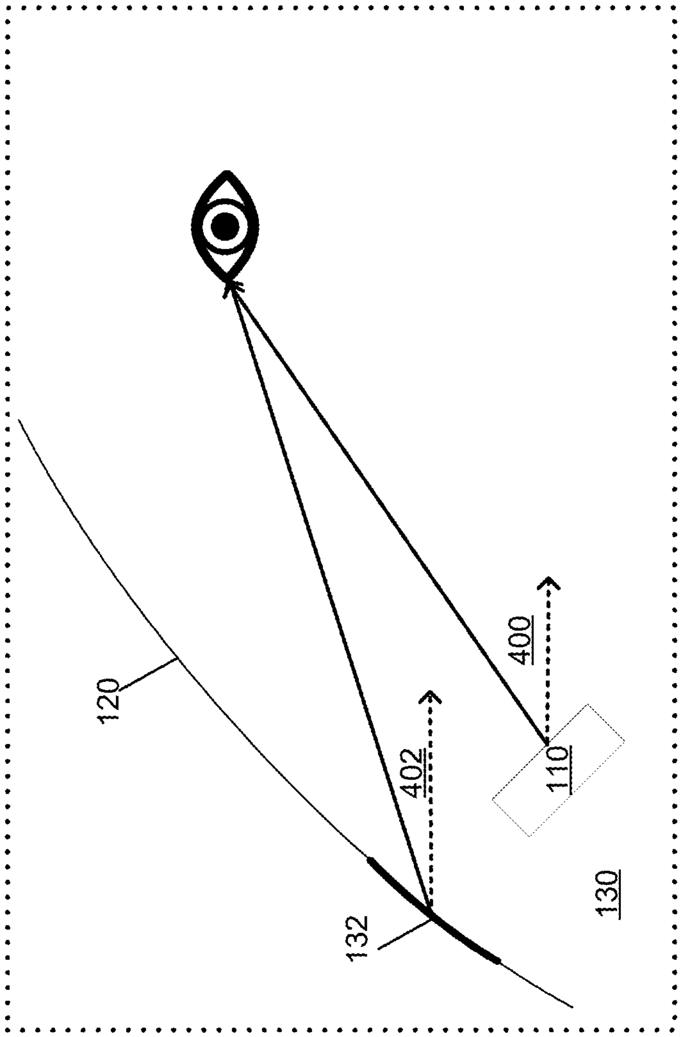
FIG. 4 is a diagram illustrating projections for a heads-up display.

Referring now to FIG. 4, along with FIGS. 1-3, the HUD projector component 108 can be configured to project a HUD 132. The display 110 emits display data at a first viewing angle 400 towards an occupant. The HUD projector component 108 emits second display data at a second viewing angle 402 towards the occupant by reflecting the second display data off the window 120. Reflecting the second display data off the window 120 forms a HUD 132, which provides a virtual image that, from the perspective of an occupant, makes the second display data appear to hover in mid-air in front of the window 120. The display 110 and HUD projector component 108 may simultaneously output first display data different from second display data via known techniques. For example, the display 110 and HUD projector component 108 may include a plurality of light emitting diodes ("LED's"). Some of the plurality of LED's may be actuated by the vehicle computer 104 to output the first display data at the first viewing angle 400 while other LED's may be actuated to output the second display data at the second viewing angle 402.

Viewing angles 400, 402 are defined with respect to a horizontal line (e.g., a line parallel to a ground surface beneath the vehicle 102 or a line in a plane that is horizontal in the vehicle 102). The viewing angle 400 is defined as an angle between the horizontal line and a line from a point on the display 110 (e.g., a center point) to eyes of an occupant viewing the display 110. The dashed lines in FIG. 4 represent horizontal lines. The viewing angle 402is defined as an angle between the horizontal line and a line from a point on the window 120, (e.g., a center point of a HUD 132) to eyes of the occupant viewing the HUD 132. The dashed lines terminated by arrows at one end in FIG. 4 represent horizontal lines. The solid lines terminated by arrows at one and in FIG. 4 represent lines of sight from the display 110, and the HUD 132, respectively.

Figure 5:
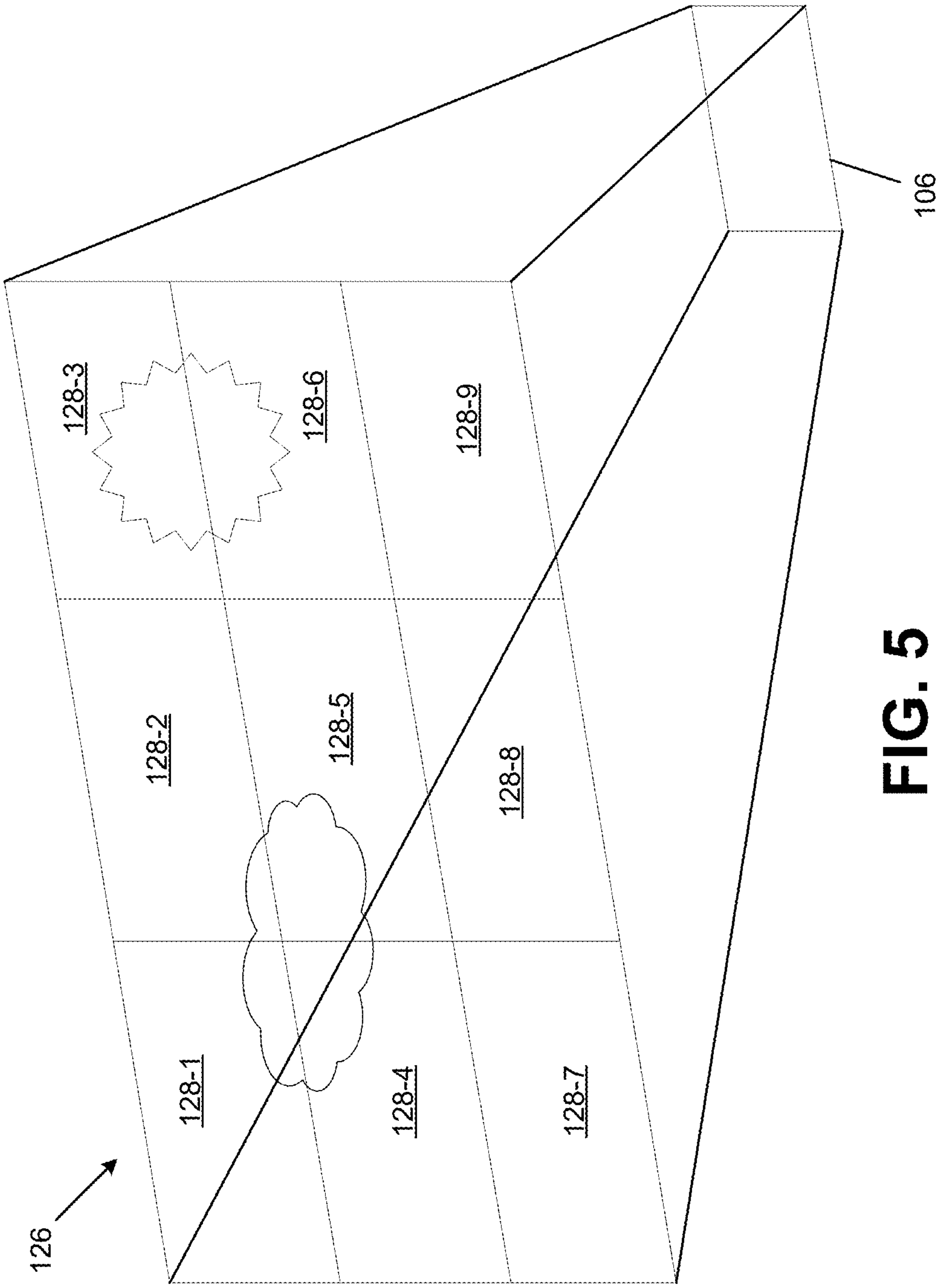
FIG. 5 illustrates an example image divided into zones.

Referring now to FIG. 5, along with FIGS. 1-4, the image 126 captured by the sensor 106 is shown. The image 126 depicts the space 124 within the field of view 122 of the sensor 106. In this example, the space 124 is to the front of the vehicle 102 as viewed through the window 120 from the perspective of the occupant. The image 126 may include an object or objects viewable in the space 124 such as trees, clouds, other vehicles, the sun, etc.

The vehicle computer 104 may obtain images 126 captured by sensors 106 via the network 114. In examples, the vehicle computer 104 may actuate (or command actuation of) the sensor 106 via the network 114 to capture the image 126. The computer 104 may further actuate the sensor 106 to capture a plurality of images 126 over a specified time. Respective images 126 have acquisition times based on the time when the image 126 was captured. Images 126 may be assigned timestamps based on time of capture.

The sensor 106 may periodically capture images 126 based on a specified passage of time. For example, as long as the vehicle is being operated (e.g. the vehicle ignition is on), the sensor 106 may capture a new image 126 every 10 seconds. The sensor 106 may make the images 126 available to components 108 via the vehicle network 114 as they are captured.

As mentioned above, the vehicle 102 may include vehicle components 108. Some vehicle components 108 may be actuated based on illumination values of the image 126. In the present example, vehicle components 108 include components of an HVAC (e.g., a temperature control and/or a fan control), and/or the HUD projector component 108 capable of projecting a HUD 132.

The computer 104 may measure a first illumination value of the image 126. As mentioned above, the first illumination value (and second illumination value) may be irradiance per unit area measured in lux (lx). 1 lx is equal to one lumen per square meter. Thus, a luminous flux of 1000 lumens over an area of 1 square meter would result in a measurement of 1000 lx. Lux can be measured by any known means such as by means of a photodiode, a scanning spectral photometer, etc. To measure the first illumination value, the computer 104 measures lux over and area, typically the entire area, of the window 120. The area of the window 120 may differ depending on, for example, the make and model of vehicle 102.

The computer 104 may compensate for saturation, gain, and exposure time. That is, after the image 126 is captured and before the first illumination value is measured, the computer 104 may compensate for saturation, gain, and exposure time. As an example, the computer 104 may store an algorithm (e.g. a neural network) for applying compensation to images 126. Once the image 126 is captured the computer 104 may input the image to the stored algorithm. The algorithm may, for example, convert pixels of a color image to lux as per the following:

$$Lux = DCV/AGC * 1/Et * DQE \qquad \text{Equation 1}$$

Where DCV is the digital color value of the image. The digital color value may refer to RGB or Hex values. AGC is the automatic gain control of the sensor 106. Automatic gain control determines how electrons from the image 126 are multiplied before being converted to digital signals. Et is the exposure time of the sensor 106 which captured the image 126. DQE is the detector quantum efficiency. DQE refers to an empirically determined constant used to determine how a camera converts photons to electrons per unit time. In Equation 1, DQE is measured in terms of (lumens*time)/(m^2).

The algorithm may utilize a neural network such as a deep neural network. The neural network may compensate for factors such as saturation, gain, exposure time, etc. in images 126 such that the computer 104 may accurately measure illumination values of the image 126. The neural network may receive the image 126 before compensation as an input, predict factors in the image 126 that are to be compensated for, and output the image with the factors compensated for. The neural network may be trained to identify and compensate for (e.g. remove or adjust) the factors based on a training process. In training a deep neural network, a training dataset that includes example images 126 with various factors may be used. The training dataset can include thousands of examples images 126, each of which includes ground truth data that indicates the factors present in the image 126. The deep neural network can be executed on the dataset of training images 126 multiple times, where each time the deep neural network is executed the output prediction is compared to the ground truth to determine a loss function. The loss function can be back-propagated through the deep neural network from output layers to input layers to adjust weights which govern processing for each layer to minimize the loss function. When the loss function reaches a user-determined minimum for the training dataset, the deep neural network training can be deemed complete, and the weights indicated by the minimum loss function may then be stored with the trained deep neural network.

The computer 104 may define an overall illumination value based on the first illumination value. That is the first illumination value may be the overall illumination value. The computer 104 may compare the first illumination value to a stored partition threshold. The partition threshold is defined by a specified illumination value. The computer 104 can partition the image into zones 128 upon determining that the threshold is exceeded. The partition threshold may be increased or decreased based on any factor such as the environment in which the vehicle 102 is operating, specifications of the vehicle components 108, time of day, etc. For example, if the vehicle 102 is operating in the northern hemisphere at 11:00 am local time on a given day of the year, the partition threshold may be 500 lx. If the computer 104 measures the first illumination value of the image 126 as above 500 lx, the computer may then determine that the first illumination value has exceeded the partition threshold.

As shown in FIG. 5, the computer 104 may define a plurality of zones such as zones 128-1, 128-2, 128-3, 128-4, 128-5, 128-6, 128-7, 128-8, and 128-9 (collectively, zones 128) of the image 126. The image 126 is comprised of pixels that can be represented and/or stored as an array. The computer 104 may divide the image 126 into a plurality of areas that respectively include less pixels than the whole image 126. For example, if the image 126 has a resolution of 1920×1080 pixels, the image 126 would include 2,073,600 pixels. Each zone 128 may be of equal size (e.g. the same resolution) or may define zones 128 of the image 126 which differ in size (e.g. have a different resolution).

Figure 6:
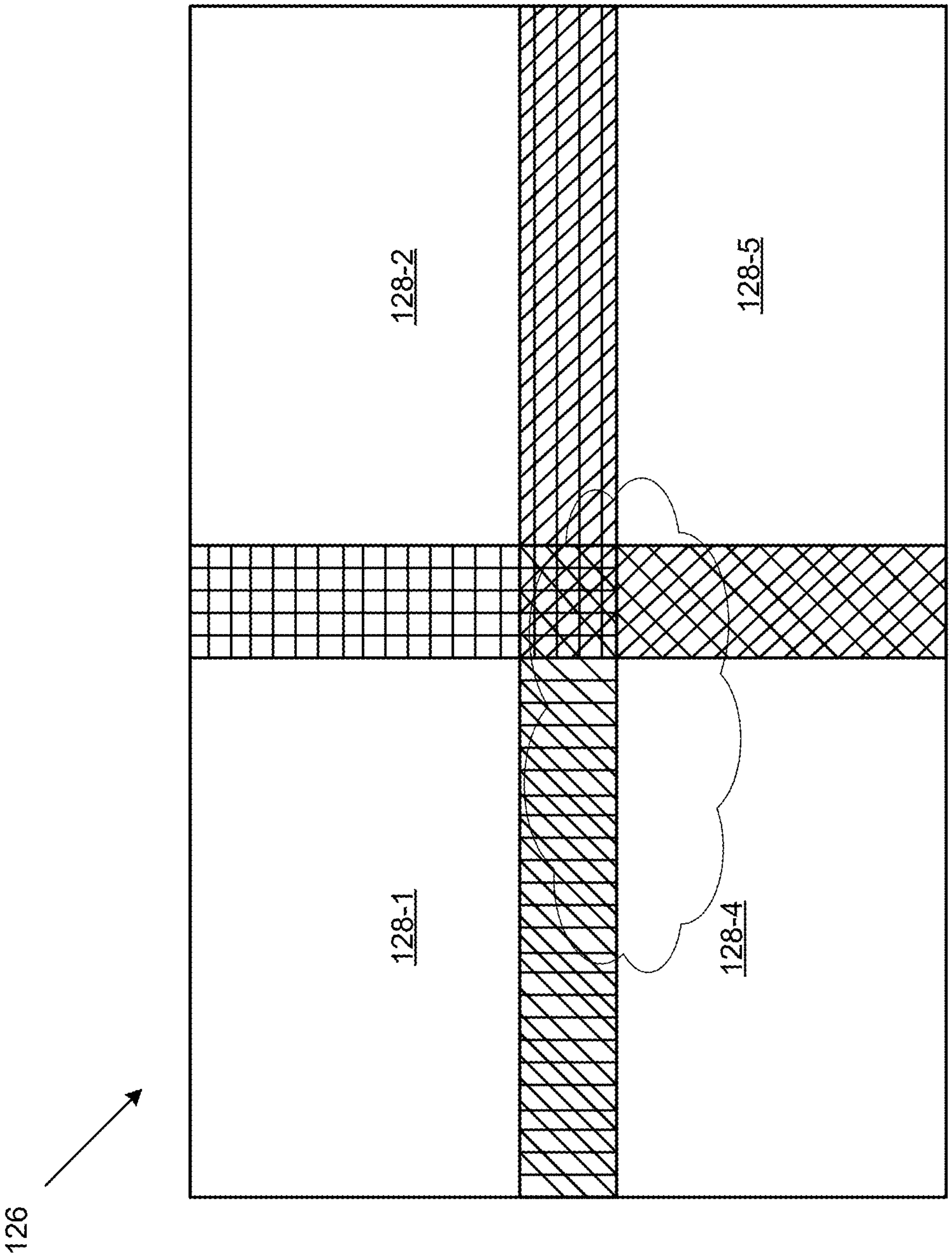
FIG. 6 illustrates an example image with overlapping zones.

Referring now to FIG. 6, along with FIGS. 1-5, the computer 104 may define the zones 128 to overlap with one another. That is, the computer 104 can be programmed with a pixel value specifying a width of an overlap between adjacent zones 128. Further, the computer 104 may be programmed so that the overlap applies to all adjacent zones 128, or, alternatively not to all, but only to specified adjacent zones 128. FIG. 6 illustrates only zones 128-1, 128-2, 128-4, 128-5 of the image 126 shown in FIG. 5 that overlap one another, although as just stated all zones 128 in the image 126 could overlap an adjacent zone or zones 128. That is, a plurality of pixels of a first zone 128 may also be within a second zone 128. FIG. 6 shows four zones 128-1, 128-2, 128-4, and 128-5 (e.g., selected from the zones defined for an image 126 as illustrated in FIG. 5) which overlap, the overlaps being illustrated by the cross-hatching in FIG. 6. As another example, if the computer 104 divides the image 126 into nine zones 128 (as is shown in FIG. 4), each zone 128 may include pixels that are included in an adjacent zones

128 (e.g. zone 128-5 may overlap with zones 128-1, 128-2, 128-3, 128-4, 128-6, 128-7, 128-8, and 128-9).

Rapidly changing illumination values (e.g. as a result of passing shadows, reflections, etc.) may result in changes to illumination values in pixels. Changes in illumination values can be required to occur in a minimum number of pixels of the image 126 before a vehicle component 108 is actuated. In examples where the change in illumination values occurs on those pixels on a boundary between adjacent zones 128, the number of pixels with changes in illumination values can be greater than the minimum number of pixels required to actuate the vehicle component 108 in one zone 128, but less than the minimum number required to actuate in each adjacent zone 128. Overlapping zones 128 may mitigate such errors by ensuring that pixels will be counted in each adjacent zone 128 to reach the minimum number of pixels required to actuate the component 108. The pixels to be overlapped between zones 128 may be the pixels required to achieve a desired minimum for circular groups of contiguous pixels.

The number of pixels to be shared between multiple zones 128 may be determined via empirical testing and/or simulation. For example, the window 120 may be exposed to varying light conditions (e.g. simulating direct sunlight, clouds, reflective objects, etc.) and the first and second illumination values may be measured as described above. If the illumination values measured for respective pixels (e.g. within 3 pixels of the bound of the zone 128) vary between the zones 128 such that the minimum number of pixels with changed illumination values is not met, and components 108 are not being actuated, then the number of pixels included in more than one zone (i.e., overlapping pixels) may be increased (e.g. to include a greater width of area around the bounds of the zones 128) such that the minimum number of pixels required to actuate components 108 is properly met The number of zones 128 to be defined by the computer 104 may be selected by the computer 104 based on the vehicle component 108 to be actuated. For example, the computer 104 may store a lookup table or the like specifying the pattern (e.g. size and arrangement) of zones 128 specified for operation of a given component 108. As used herein, a "lookup table" refers to a data table or the like that relates certain inputs to certain outputs. The lookup table may be compiled or generated based on empirical testing and/or simulation. For example, a given component 108, such as a HUD projector or HVAC unit in a real or simulated vehicle 102, may be actuated based on illumination values from multiple images 126 having different numbers of zones 128. The number of zones 128 could then be selected for the component 108 based on, for example, the minimum number of zones 128 necessary to provide illumination values sufficient to actuate the component 108 such that a test user was satisfied with the actuation. The computer 104 may begin the illumination value measurement process for a specific component 108 by accessing entries in the lookup table relating to the component 108. The computer 104 may then actuate or control the component 108 based on the entries for the component 108. As an example, a component 108 such as a projector component 108 may be specified in the lookup table to warrant illumination values from nine zones 128 for operation (as is shown in FIG. 4) whereas for another component 108 such as an HVAC fewer (e.g., three) zones 128 could be specified.

In another example, an HVAC component 108 may be actuated in a real or virtual environment based on illumination values from differing numbers of zones 128 of the same image 126. A lookup table or the like can then be generated wherein zone specification for the HVAC may be the minimum number of zones that resulted in an actuation of the HVAC that was found satisfactory by one or more test users. For example, the HVAC component 108 could be actuated twice with different respective airflows based on illumination values from the same image 126 having greater illumination values towards the bottom left of the image 126 (e.g. zone 128-7). The first test actuation is based on illumination values from nine zones 128 of the image 126. The second test actuation is based on illumination values from three zones 128 of the image 126. If the test user was satisfied with a redirection of airflow by the HVAC towards the left of the vehicle interior, then the zone specification for the HVAC component 108 could be three zones. Similarly, empirical or simulation testing for a HUD projector component 108 could be based on whether the HUD 132 is deemed sufficiently readable by a test user based on a specified number and arrangement of zones.

As a further example of component 108 zone specification, HVAC operations may specify three zones 128, based on areas of a vehicle cabin that may include different occupants, where the computer 104 may determine to redirect air flows differently to the three different areas. In such an example, the image 126 may be divided into three equal columns. As another example, HUD operations may warrant nine zones 128 such that the computer 104 may determine illumination values with greater precision than would be required for HVAC operations. In such an example, the zones 128-1, 128-2, 128-3, 128-4, 128-5, 128-6, 128-7, 128-8, and 128-9 could be defined, as illustrated in FIG. 4.

The computer 104 may measure second illumination values of the zones 128. That is, where the first illumination value corresponds to the entire image 126, the second illumination values may correspond only to specific zones 128 of the image 126. Second illumination values, like first illumination values, may be specified in units of lux (i.e., irradiance per unit area). The second illumination values may be measured using any suitable method as described above relating to the measurement of the first illumination values. The computer 104 may measure the second illumination values after the computer 104 has compensated for gain, exposure time, etc.

The computer 104 may collect a plurality of images of the window 120 over a specified time. Each image 126 may have an acquisition time respectively. That is, the computer 104 may actuate the sensor 106 to capture a plurality of images 126 of the space 124. The computer 104 may actuate the sensor 106 to capture a specified number of images 126 within a specified time and may also actuate the sensor 106 to continuously (e.g. spaced apart only by a specified amount of time) capture images 126 while the vehicle 102 is operating. In addition to capturing a plurality of images 126, the computer 104 may measure the first illumination value and (provided the first illumination value exceeds the partition threshold) second illumination values for each image 126 respectively.

The images 126 may be weighted by acquisition time. "Weighted" in this context means that a prioritization is specified. Images 126 being weighted includes the illumination values measured from the image 126 being weighted as well. For example, illumination values from images 126 with higher weights can be given a higher priority than illumination values from images 126 with lower weights. More recently measured illumination values may be weighted to be given a higher priority than previously measured illumination values. The computer 104 may store a specified variation threshold, typically a value in lux, which defines permitted variation between illumination values of respective images 126. If illumination values of corresponding zones 128 in a first image and a second image differ by an amount greater than the specified variation threshold, the computer 104 may discard the first image and capture a further image to compare with the second image. The process may be repeated by the computer 104 until the differences between illumination values of the images 126 is within the variation threshold. For example, the computer 104 may measure second illumination values for a plurality of images 126 captured within a specified time. The computer 104 may compare the second illumination values measured for respective zones 128 of different images 126 against each other. If the second illumination values of each respective zone 128 in each respective image 126 vary by more than a specified variation threshold, the computer 104 may measure the second illumination values of a further image 126 to be compared with the second illumination values of the previous image 126. As images 126 may be continuously or regularly captured by the sensor 106 after a specified lapse of time, the computer 104 need only wait for the further image 126 to be captured before comparing illumination values to the previous image 126. When the second illumination values are within the specified variation threshold, the second illumination values have "converged."

As an example, the sensor 106 may capture one image 126 per second. The second illumination value of zone 128-1 in the first image may be 1000 lx whereas the second illumination value of zone 128-1 in the second image may be 1500 lx. The computer 104 retrieves the variation threshold from memory. If the variation threshold is 200 lx, the computer 104 may determine that zone 128-1 has exceeded the variation threshold as the measured second illumination values differ by more than 200 lx (1500 lx−1000 lx=500 lx). As a result, the computer 104 waits for a third image to be captured by the sensor 106 and the computer 104 measures the second illumination values of the third image to be compared to the second illumination values of the previous image.

The computer 104 may actuate vehicle components 108 based on comparisons of at least some of the second illumination values within an image 126. That is, for components 108 that require illumination values as input data, the computer 104 may actuate the components 108 in differing ways based on the comparisons of the second illumination values of respective zones 128 as described below. Computer 104 actuation may be enabled or disabled for specific components based on selections made during vehicle 102 manufacturing, user selection, etc. As an example, the vehicle user may specify that the computer 104 may actuate the HUD projector component 108 but not the HVAC component 108. The computer 104 may, for example, store a lookup table or the like specifying actions to be taken based on the comparisons of second illumination values for specific components 108. Table 1 illustrates an example lookup table for an HVAC. Table 1 includes a non-exhaustive list of some data upon which actuation of an HVAC may be based.

TABLE 1

| Data | Actuate |
|---|---|
| Leftmost zone 128 has highest second illumination value. | Actuate HVAC to redirect airflow to the left of the vehicle interior. |
| Right zone 128 has highest second illumination value. | Actuate HVAC to redirect airflow to the right of the vehicle interior. |
| Middle zone 128 has highest second illumination value. | No actuation of HVAC required. |

The computer 104 may actuate the HUD projector component 108 to adjust a HUD 132 based on a comparison of the second illumination values of the zones 128 within the image 126. When actuating a vehicle component 108 such as the HUD projector component 108 the computer 104 may list each zone 128 by measured second illumination value starting with the highest. The HUD projector component 108 may then be actuated based on the relative second illumination values to make the HUD 132 more readable for the vehicle occupant by, for example, applying a decrease or an increase of a brightness of the HUD 132, shifting the HUD 132 to the left or right, etc. As an example, zone 128-3 may have a second illumination value of 1500 lx followed by zone 128-6 with 1300 lx. Each other zone 128 may have lesser second illumination values. The computer 104 may retrieve a lookup table which specifies that, when zones 128-3 and 128-6 have the highest second illumination values, the HUD projector component 108 is to be actuated to shift the HUD projection left such that the vehicle occupant need not look at the brightest areas of the window 120 in order to view the HUD 132. As another example, if zones 128-7 and 128-4 have the highest second illumination values, the computer 104 may actuate the HUD projector component 108 to increase the brightness of the HUD projection such that the vehicle occupant is likely to be able to read the HUD 132 despite any glare on the window 120 behind the HUD 132.

The computer 104 may actuate an HVAC system to adjust airflow based on the comparison of the second illumination values of the zones 128 within the image 126. For some vehicle components 108, such as the HVAC, the computer 104 may convert the second illumination value from lux to watts in order to actuate the component 108 based on the second illumination value. An equation by which the computer 104 may convert lux to watts is given below:

$$P = lx * A/\eta \qquad \text{Equation 2}$$

Where P is power measured in watts, lx is the illuminance measured in lux, A is the area of the window 120 measured in meters squared, and y is the luminous efficacy in lumens per watt. Luminous efficacy is found via the ratio of a light source's luminous flux to power.

As mentioned above, the HVAC system may only require second illumination values from three zones. For example, HVAC may require a left zone (including zones 128-1, 128-4, and 128-8), a middle zone (including zones 128-2, 128-5, and 128-8), and a right zone (128-3, 128-6, and 128-9) of the image 126. The second illumination values of the zones may be compared to one another and to an HVAC variation threshold in order for the computer 104 to determine how to actuate the HVAC. That is, in order to actuate the HVAC based on the second illumination values, the computer 104 may determine that the difference between two zones is greater than the HVAC variation threshold. Based on a determination that the HVAC variation threshold is exceeded, the computer 104 may, for example, actuate HVAC to direct air flow in the direction of the higher second illumination values.

Continuing with the example, the HVAC variation threshold may be 400 watts. If the left zone's second illumination value is 1000 watts, and the middle illumination zone is 500 watts, the computer 104 may determine that the HVAC variation threshold is exceeded (as the left and middle zones are adjacent and 1000 watts−500 watts=500 watts). The computer 104 may then actuate the HVAC to direct air flow to the left side of the window 120. As another example, the left zone may have a second illumination value of 1000 watts, the middle zone may have a second illumination value of 800 watts, and the right zone may have an illumination value of 400 watts. Because the left zone and the right zone have a difference between their illumination values in excess of 400 watts, the computer 104 may actuate the HVAC to direct air flow to the left side of the window 120.

Example Processes

Figure 7:
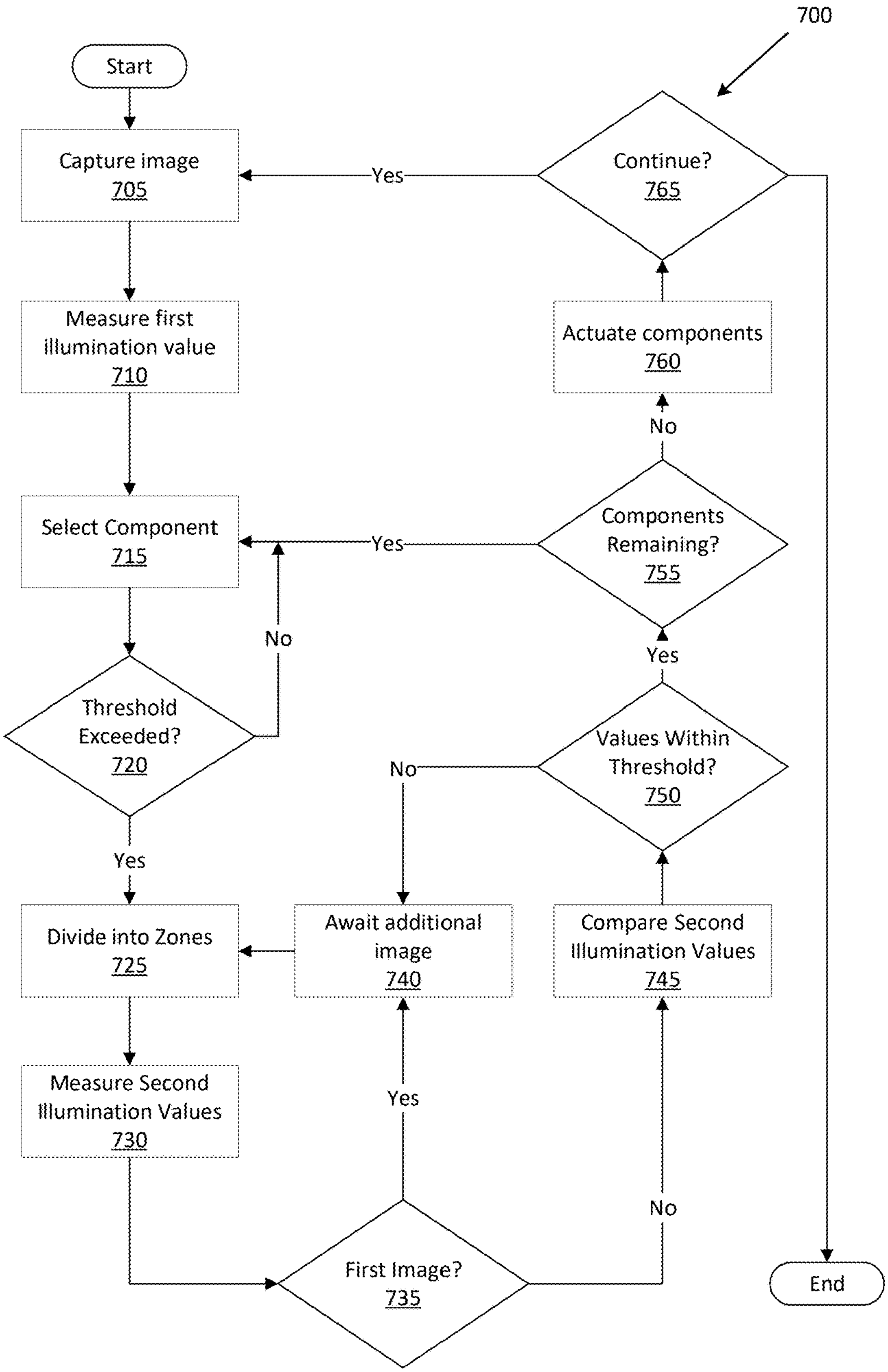
FIG. 7 is a flowchart of an example process to actuate vehicle components based on illumination values.

FIG. 7, described with reference to FIGS. 1-6, illustrates an example process 700 for capturing images 126 of a space 124, measuring illumination values of the image 126, and actuating vehicle components 108 based on comparing the illumination values. The process can be carried out according to program instructions executed by the computer 104.

The process begins in block 705 in which the sensor captures an image 126 of the space 124 and the computer 104 receives the image 126. The sensor 106 may capture the image 126 based on an elapsed amount of time, a request from a vehicle occupant, etc. Generally, the sensor 106 continuously or regularly captures images 126 and transmits the images 126 via the network 114 based on a specified elapse of time.

Next, in a block 710, the computer 104 measures the first illumination value. As explained above, the first illumination value is the lux measured from an image 126 of the window 120.

Next, in a block 715, the computer 104 identifies a first component 108 for which an illumination value is to be measured. As mentioned above, there may be only one component 108 or multiple components 108 for which illumination values are to be measured. In the case of only one component 108, the block 715 may be omitted. Where there are multiple components 108, the computer 104 may first select the component 108 which, for example, has the higher zone specification (e.g. nine rather than three). The computer 104 may also select the first component 108 based on a relative data throughput of the component 108. That is, components 108 which are actuated more frequently may be selected first. Once the following steps have been completed, the computer 104 may then select the next component 108. Once the component 108 has been selected, the computer 104 carries out the following steps for that component 108.

Next, in a decision block 720, the computer determines whether the first illumination value has exceeded the specified partition threshold for partitioning the image 126 into zones 128. If the first illumination value does not exceed the specified partition threshold the process continues to block 760. Otherwise the process continues to block 720.

Next, in a block 725, the computer 104 divides the image 126 into zones 128 based on the component identified in the block 720. For example, if the component 108 is an HVAC, the computer 104 could divide the image 126 into three zones 128 whereas if the component 108 is the HUD projector component 108 the computer 104 could divide the image 126 into nine zones.

Next, in a block 730, the computer 104 measures the second illumination values of the respective zones 128 of the image 126. Depending on the component 108 selected in block 720 (e.g. HVAC) the computer 104 may also convert the second illumination values from lux to watts in this block.

Next, in a decision block 735, the computer 104 determines whether the image 126 from which the second illumination values were measured in block 730 was the first image captured. That is, the computer 104 determines whether the current image 126 was preceded by a prior image 126 within a specified amount of time. The specified amount of time may be any amount of time that is determined to be sufficient enough to provide accurate data. That is, the specified time can be selected based on empirical testing and/or simulation. As an example of empirical testing, different specified times may be used in a test implementation. In the test implementation, the process 700 could be executed utilizing the respective different specified times. The time which most frequently results in illumination values being within the variation threshold could then be chosen as the specified time for production implementations. For example, a specified time of five seconds between images 126 may generally result in illumination values which are outside the variation threshold due to the changing features of the space 124 over time as the vehicle 102 may move (e.g. changing ambient light, passing shadows, passing reflective objects, etc.). In this example, the specified amount of time may be one second. If no other image 126 was captured in the one second preceding the capture of the current image 126, then the computer 104 determines that the current image 126 is the first image and proceeds to block 740. Otherwise, the process continues to a block 745.

In the block 740, the computer 104 has determined that the image 126 is the first image 126 captured. The computer 104 then obtains a further image 126 from the sensor 106. The process 700 then continues in the block 725.

In the block 745, the computer 104 has determined that the image 126 is not the first image 126 captured. The computer 104 then compares the second illumination values to one another. The comparison of second illumination values is further explained in process 800.

In a decision block 750, the computer 104 has determined that the current image 126 is not the first image. The computer 104 now determines whether the second illumination values of the images are within the variation threshold, as described above. If the second illumination values exceed the variation threshold, the process continues to block 740. Otherwise, the process continues to decision block 755.

Next, in decision block 755, the computer 104 determines whether any component 108 which utilizes illumination value data remains. That is, if there are any components 108 which have not yet been selected in block 720, the process continues to block 720 and the computer 104 selects the components 108 such that each component which requires illumination value data may be provided with such data. If no components 108 remain, the process continues to block 760.

Next, in block 760, the computer 104 actuates the components 108 based on the comparisons as described above.

Next, in a block 765, the computer 104 determines whether to continue the process 700. For example, once the process 700 is initiated, the computer 104 could continue to capture images 126 by returning to block 705. However, the process 700 could end upon some input or event to terminate the process 700 such as a vehicle user ceasing operation of the vehicle 102 (e.g., turning off a propulsion system such as an engine), a user providing input to end the process, etc. If the process 700 is to continue, then the process returns to block 705. Otherwise, the process 700 ends.

Figure 8:
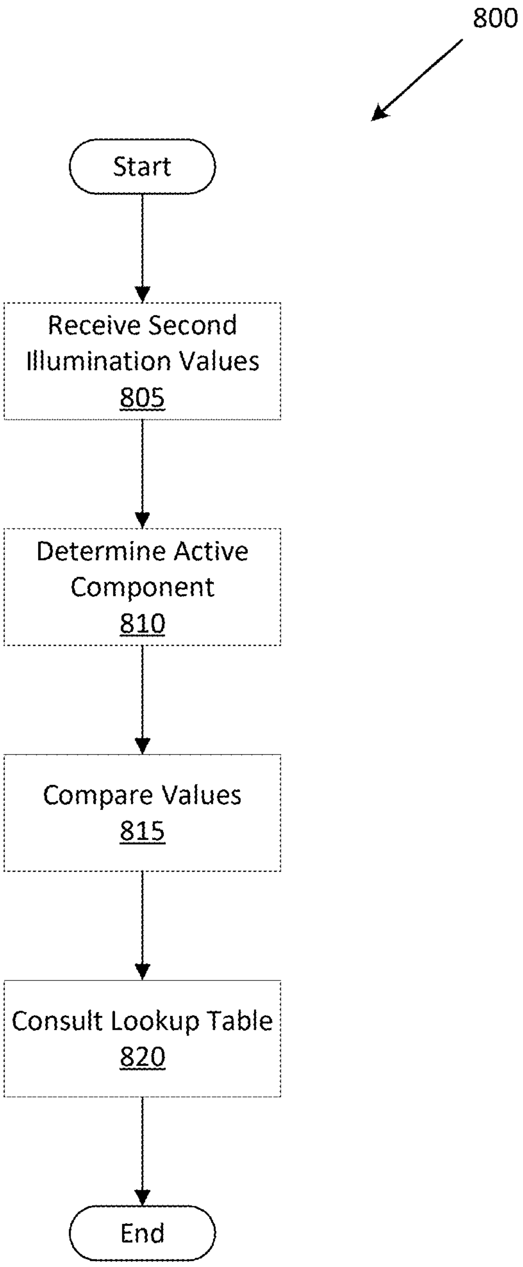
FIG. 8 is a flowchart of an example process to compare illumination values.

FIG. 8, described with reference to FIGS. 1-7, illustrates an example process 800 for comparing second illumination values. Process 800 can be a subprocess of the process 700, and in the present discussion is represented by block 745 from process 700.

The subprocess 800 begins in a block 805 which follows the block 735 of process 700. In the block 805, the computer 104 receives the second illumination values. That is, the computer 104 has measured the second illumination values of the images 126 and, having access to all relevant second illumination values, is prepared to begin comparison of the second illumination values.

Next, in a block 810, the computer 104 determines the active component 108. For example, the active component 108 may be identified and stored in a memory of the computer 104 based on executing the block 715 described above.

Next, in a block 815, the computer 104 compares the second illumination values of respective zones 128 to one another. For example, the computer 104 may list the second illumination values by decreasing magnitude (e.g. the first value may be 600 lx, the second value may be 500 lx, etc.) The computer 104 may retain the zone 128 from which each second illumination value was measured for use in a block 820.

Next, in the block 820, the computer 104 retrieves and consults the lookup table mentioned above. The computer 104 may reference the lookup table based on which zones 128 have the highest second illumination values, and each specific component 108 may have a specific associated lookup table specifying different actions to be taken based on different second illumination values. For example, the lookup table for a HUD projector component 108 may specify that, where the highest second illumination values are focused towards the right side of the image 126, the HUD 132 is to be shifted left by the projector component 108. Continuing with the example, the lookup table may further specify that where the highest second illumination values are focused towards the left side of the image 126, the HUD 132 is to have its brightness increased. The subprocess then ends and proceeds to the block 750 of process 700.

Operations, systems, and methods described herein should always be implemented and/or performed in accordance with an applicable user's manual.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. Of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computing device, the computing device including a processor and a memory, the memory storing instructions executable by the processor, including instructions to:

determine a first illumination value based on an image of a space about a vehicle;

upon the first illumination value exceeding a threshold, determine second illumination values for respective zones of the image, one or more of a number, size and arrangement of the zones being defined based on a vehicle component, wherein the first and second illumination values are determined after compensating for sensor saturation; and actuate the vehicle component based on a comparison of at least some of the second illumination values of respective zones to one another.

2. The system of claim 1, wherein the image is of the space through a window outside of the vehicle.

3. The system of claim 1, wherein the vehicle component is a climate control system.

4. The system of claim 1, wherein the vehicle component is a vehicle display.

5. The system of claim 1, wherein the zones are further defined based on a resolution of a sensor.

6. The system of claim 1, wherein the first and second illumination values are irradiance per unit area measured in lux.

7. The system of claim 1, the instructions including further instructions to collect a plurality of images of the space over a specified time.

8. The system of claim 7, wherein the second illumination values are weighted by respective acquisition times of the images.

9. The system of claim 1, wherein some of the zones overlap.

10. The system of claim 1, the instructions including further instructions to compare the second illumination values by a neural network.

11. The system of claim 10, wherein the neural network compensates for at least one of saturation, gain, and exposure time.

12. A method comprising:

determining a first illumination value based on an image of a space about a vehicle;

upon the first illumination value exceeding a threshold, determining second illumination values for respective zones of the image, one or more of a number, size and arrangement of the zones being defined based on a vehicle component, wherein the first and second illumination values are determined after compensating for sensor saturation; and actuating the vehicle component based on a comparison of at least some of the second illumination values of respective zones to one another.

13. The method of claim 12, wherein the image is of the space through a window outside of the vehicle.

14. The method of claim 12, wherein the vehicle component is a climate control system.

15. The method of claim 12, wherein the vehicle component is a vehicle display.

16. The method of claim 12, wherein the first and second illumination values are irradiance per unit area measured in lux.

17. The method of claim 12, further comprising collecting a plurality of images of the space over a specified time.

18. The method of claim 17, wherein each image has an acquisition time respectively.

19. The method of claim 18, wherein the second illumination values are weighted by respective acquisition times of the images.

20. The method of claim 12, wherein some of the zones overlap.

* * * * *